United States Patent
Koyanagi

(10) Patent No.: US 10,549,457 B2
(45) Date of Patent: Feb. 4, 2020

(54) METHOD FOR MANUFACTURING MOLD FOR RUBBER ARTICLE

(71) Applicant: BRIDGESTONE CORPORATION, Tokyo (JP)

(72) Inventor: Tomo Koyanagi, Soka (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/082,367

(22) PCT Filed: Jan. 23, 2017

(86) PCT No.: PCT/JP2017/002129
§ 371 (c)(1),
(2) Date: Sep. 5, 2018

(87) PCT Pub. No.: WO2017/159045
PCT Pub. Date: Sep. 21, 2017

(65) Prior Publication Data
US 2019/0061203 A1 Feb. 28, 2019

(30) Foreign Application Priority Data
Mar. 15, 2016 (JP) ................. 2016-051064

(51) Int. Cl.
*B29C 33/10* (2006.01)
*B29D 30/06* (2006.01)
(Continued)

(52) U.S. Cl.
CPC .............. *B29C 33/10* (2013.01); *B29C 33/02* (2013.01); *B29C 35/0288* (2013.01);
(Continued)

(58) Field of Classification Search
CPC . B29C 33/10; B29C 33/3842; B29D 30/0606; B29D 2030/0617
See application file for complete search history.

(56) References Cited

U.S. PATENT DOCUMENTS

| | | | |
|---|---|---|---|
| 4,021,168 A | 5/1977 | Dailey | |
| 4,436,497 A | 3/1984 | Dahl et al. | |

(Continued)

FOREIGN PATENT DOCUMENTS

| | | |
|---|---|---|
| EP | 2214880 A1 | 8/2010 |
| JP | 2002-234033 A | 8/2002 |

(Continued)

OTHER PUBLICATIONS

Feb. 11, 2019 Search Report Issued on European Application No. 17766053.7.

(Continued)

*Primary Examiner* — James P Mackey
(74) *Attorney, Agent, or Firm* — Oliff PLC

(57) ABSTRACT

A fixing hole of a mold for rubber article is easily inspected and the vent piece is securely fixed in the fixing hole. A vent piece having a vent hole is fixed in a fixing hole of a mold, so as to manufacture the mold having the vent hole. The vent piece has a first inspection part to be inserted into the fixing hole, a caulking part thicker than the first inspection part and is to be fixed in the fixing hole by caulking, and a second inspection part positioned between the first inspection part and the caulking part and is thicker than the first inspection part and thinner than the caulking part. When the first inspection part is inserted into the fixing hole but the second inspection part is not inserted into the fixing hole, the caulking part is fixed in the fixing hole by caulking.

20 Claims, 5 Drawing Sheets

(51) Int. Cl.
*B29C 33/02* (2006.01)
*B29C 35/02* (2006.01)
B29C 33/38 (2006.01)
B29L 30/00 (2006.01)

(52) U.S. Cl.
CPC ...... *B29D 30/0606* (2013.01); *B29C 33/3842* (2013.01); *B29D 2030/0617* (2013.01); *B29L 2030/002* (2013.01)

(56) References Cited

U.S. PATENT DOCUMENTS

| | | | |
|---|---|---|---|
| 6,280,176 | B1 | 8/2001 | Boyce et al. |
| 6,817,848 | B2 * | 11/2004 | Ishihara ............. B29D 30/0606 249/141 |
| 9,868,261 | B2 * | 1/2018 | Takahashi .......... B29D 30/0662 |
| 2002/0071880 | A1 | 6/2002 | Ishihara |
| 2002/0127292 | A1 | 9/2002 | Gallinotti et al. |
| 2010/0166900 | A1 | 7/2010 | Hajduch |
| 2015/0336343 | A1 | 11/2015 | Takahashi |

FOREIGN PATENT DOCUMENTS

| | | |
|---|---|---|
| JP | 2003-340825 A | 12/2003 |
| JP | 2012-122311 A | 6/2012 |
| JP | 2012-240233 A | 12/2012 |
| JP | 2014-136415 A | 7/2014 |
| JP | 2014-180867 A | 9/2014 |
| JP | 2015-221545 A | 12/2015 |
| WO | 2009-053776 A1 | 4/2009 |

OTHER PUBLICATIONS

Mar. 28, 2017 International Search Report issued in International Patent Application No. PCT/JP2017/002129.

* cited by examiner

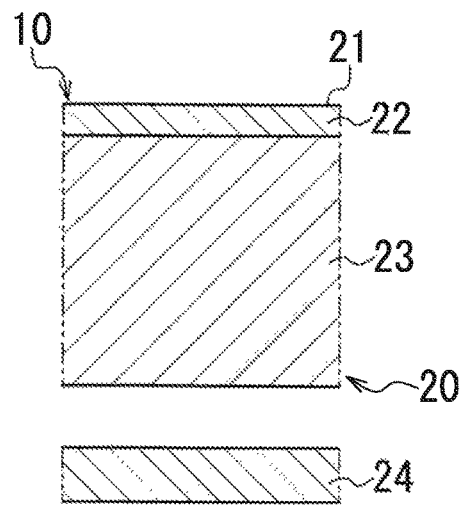
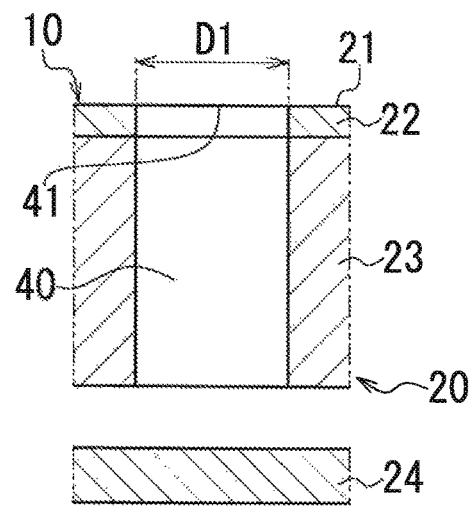
FIG. 2A
FIG. 2B
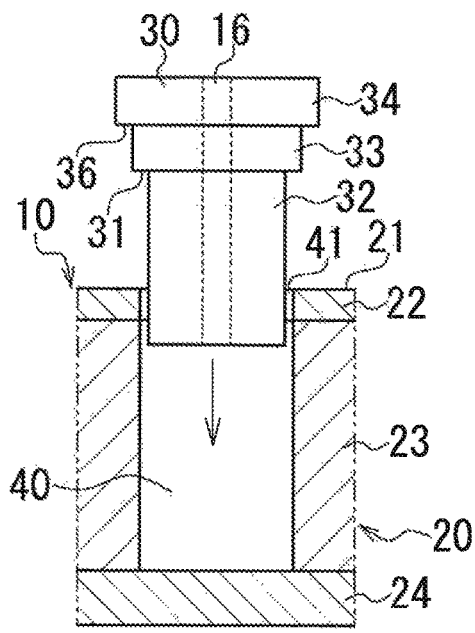
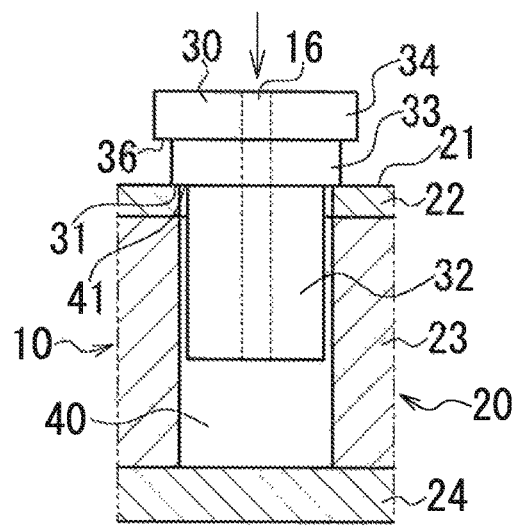
FIG. 2C
FIG. 2D
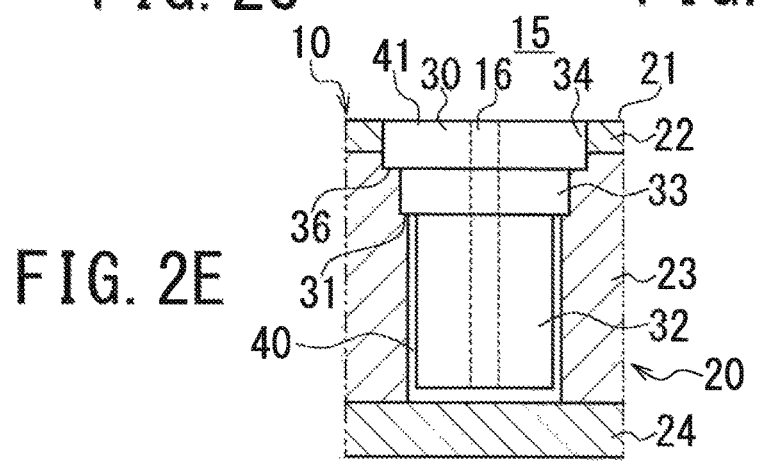
FIG. 2E

METHOD FOR MANUFACTURING MOLD FOR RUBBER ARTICLE

BACKGROUND OF THE INVENTION

Field of the Invention

The present invention relates to a method for manufacturing a mold for rubber article having vent holes.

Related Background of the Invention

When a rubber article is molded by a mold, the rubber article is pushed against the mold and is molded in a shape corresponding to a shape of the mold. At the time, air is shut in between the mold and the rubber article and thus an insufficient filling of rubber may occur in the rubber article. In contrast, the tire vulcanization mold has been known, in which a vent piece is fixed to a vent passage (fixing hole) and air is exhausted from a through-hole (vent hole) of the vent piece (cf. Patent Literature 1).

However, at the time of fixing the vent piece in the fixing hole, it is necessary to push each of a large number of vent pieces into each of the fixing holes by hand and thus it takes labor. In addition, when a hole diameter of the fixing hole is large, the vent piece cannot be securely fixed in the fixing hole, so that the vent piece is likely to slip out of the fixing hole. In contrast, even if the hole diameter of the fixing hole is small, it is feared that the vent piece could not be securely fixed in the fixing hole.

Due to variations in an outer diameter of the vent piece, the hole diameter of the fixing hole may not be sometimes appropriate for the outer diameter of the vent piece. Therefore, it is necessary to inspect the hole diameters of all fixing holes before fixing the vent pieces so as to securely fix the vent pieces in the fixing holes. However, in the conventional tire vulcanization mold described in Patent Literature 1, an inspection of the hole diameters of the fixing holes cannot easily be conducted and it takes labor and time for the inspection of the hole diameters.

Prior Art

PATENT LITERATURE

Patent Literature 1: Japanese Patent Laid-Open No. 2015-221545

SUMMARY OF THE INVENTION

Problems to be Solved by Invention

The present invention was made in view of the above-described conventional problems and an object thereof is to facilitate the inspection of the hole diameters of the fixing holes of the mold for rubber article and to securely fix the vent pieces in the fixing holes.

Means for Solving Problems

The present invention is a method for manufacturing a mold for rubber article so as to manufacture the mold for rubber article having vent holes by fixing a vent piece having the vent hole in a fixing hole of the mold for rubber article.

The vent piece has a first inspection part that is to be inserted into the fixing hole, a caulking part that is thicker than the first inspection part and is to be fixed in the fixing hole by means of caulking, and a second inspection part that is positioned between the first inspection part and the caulking part and is thicker than the first inspection part and thinner than the caulking part.

When the first inspection part of the vent piece is inserted into the fixing hole but the second inspection part of the vent piece is not inserted into the fixing hole, the caulking part of the vent piece is fixed in the fixing hole by means of caulking.

According to the present invention, the inspection of the hole diameter of the fixing hole of the mold for rubber article can be easily conducted and the vent piece can be securely fixed in the fixing hole.

BRIEF DESCRIPTION OF THE DRAWINGS

FIGS. 2A to 2E are views showing a process of forming a vent hole in the embodiment;

DESCRIPTION OF THE PREFERRED EMBODIMENTS

An embodiment of a method for manufacturing mold for rubber article will be described with reference to the drawings.

The mold for rubber article of the embodiment is a mold for rubber molding and is manufactured by the method for manufacturing mold for rubber article of the present embodiment. The mold for rubber article is provided in a molding device for rubber article to molds a rubber article.

In the following, the method for manufacturing the mold for rubber article (hereinafter referred to as mold) will be described, taking it as an example that the mold for rubber article is a mold for tire (mold for tire molding). Therefore, the rubber article is a tire and the molding device for rubber article is a tire molding device. The mold is used as a mold for tire at the time of molding of the tire (at the time of vulcanization) and molds the tire.

Figure 1:
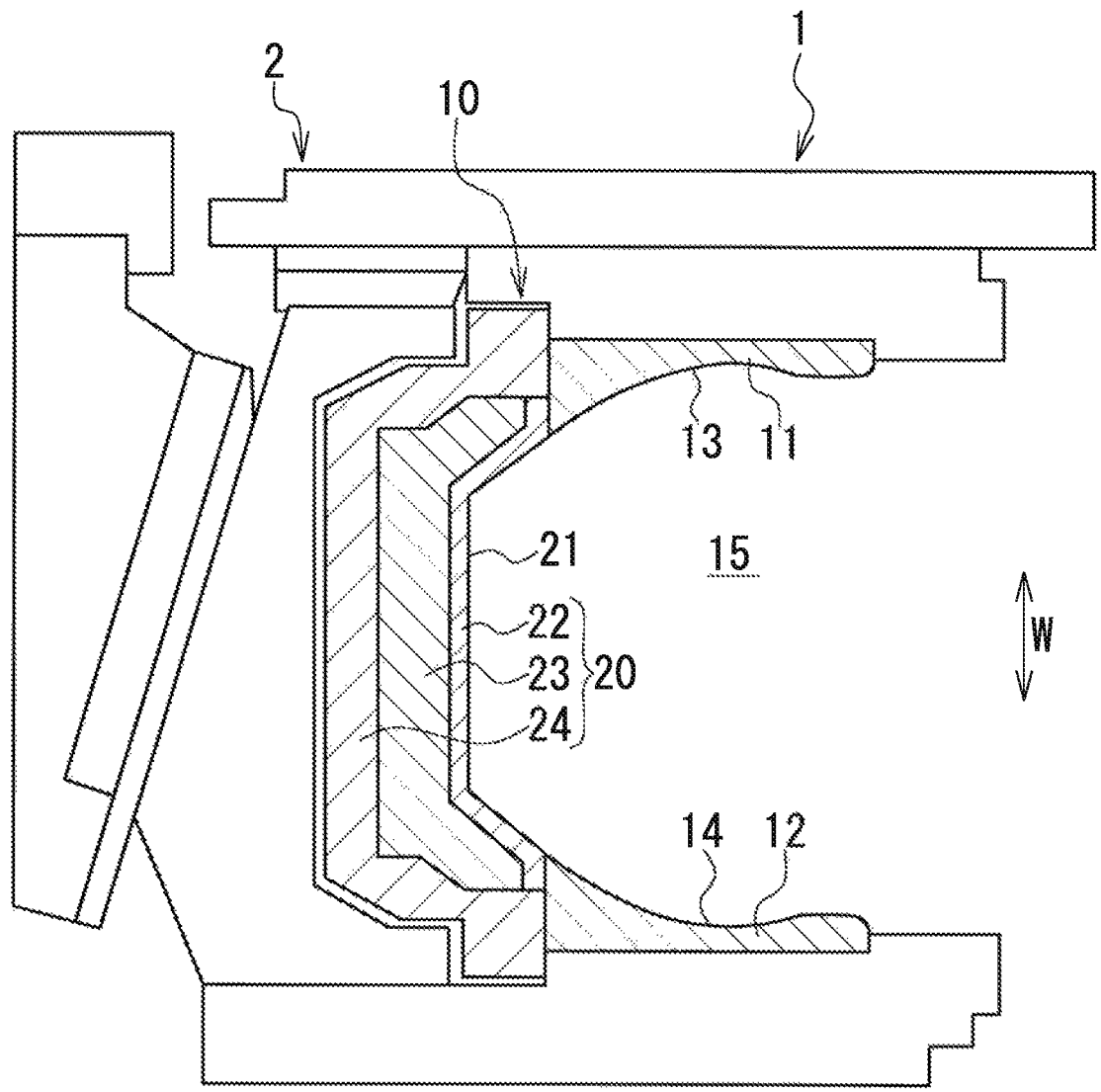
FIG. 1 is a sectional view illustrating a molding device for rubber article of an embodiment.

FIG. 1 is a sectional view illustrating the molding device for rubber article (tire molding device 1) of the embodiment, and illustrate the tire molding device 1 which is cut along a width direction of the tire (tire width direction W). In addition, FIG. 1 illustrates a part of the tire molding device 1 which is being closed.

As illustrated, the tire molding device 1 comprises an openable container 2 and a ring-shaped mold 10 to house the tire. The container 2 has an openable mechanism to open and close the mold 10 and houses the mold 10. The mold 10 is attached to the container 2 and is opened and closed by the container 2. The tire molding device 1 heats and vulcanizes the tire in the mold 10 and thus molds the tire by the mold 10.

The mold 10 is an outer mold for molding an outer surface of the tire, and has a pair of ring-shaped side molds (upper side mold 11 and lower side mold 12), a plurality of split molds 20 and molding surfaces 13, 14, 21 to mold the tire. The upper side mold 11 and lower side mold 12 have the molding surfaces (side molding surfaces) 13, 14 which are brought into contact with side parts of the tire, respectively and thus mold the side parts of the tire by the molding surfaces 13, 14.

The plurality of split molds 20 is a segment divided in a circumferential direction of the mold 10 (mold circumferential direction), and is a tread mold to mold a tread part of the tire. The mold circumferential direction agrees with the circumferential direction of the tire (tire circumferential direction). Each of the plurality of split molds 20 has the molding surface (tread molding surface) 21 which is brought into contact with the tread part of the tire, and mold the tread part of the tire by the molding surfaces 21 with the split molds being put together into a ring shape.

At the time of molding the tire, firstly, the mold 10 is opened and an un-vulcanized tire is placed on the molding surface 14 of the lower side mold 12. Successively, the mold 10 is closed so as to house the tire in an internal space 15 of the mold 10. In the state, the tire molding device 1 heats the tire to the molding temperature (vulcanization temperature) by a heating mechanism and pressurizes the tire by the bladder placed in the tire. In this way, the tire is vulcanized and molded. The mold 10 is brought into contact with the tire, so that the tire is molded by the molding surfaces 13, 14, 21. After molding the tire, the mold 10 is opened and then the tire after molding (after vulcanization) is taken out of the mold 10.

The split mold 20 has a molding member 22 to mold the tire, a support member 23 to support the molding member 22 and a holding member 24 to hold the molding member 22 and the support member 23. The molding member 22 is a design surface member having the molding surface 21 (tire molding surface), and is attached to the support member 23 by an attaching member (s) (e.g. bolt). The support member 23 is in contact with a back surface (surface on the side opposite to the tire) of the molding member 22 and covers the back surface (outer periphery part) of the molding member 22. The support member 23 is attached to the holding member 24 by an attaching member (s) and is located between the molding member 22 and the holding member 24. The holding member 24 is in contact with a back surface of the support member 23 and covers the back surface of the support member 23. The holding member 24 is attached to the container 2, and thus the plurality of split molds 20 are arranged into a ring shape in the container 2.

The molding surface 21 is a molding part (contact part) of the molding member 22. The molding member 22 is brought into contact with the tire through the molding surface 21 so as to mold the tire. The molding member 22 is thinner than the support member 23 and the holding member 24 and the support member 23 is thicker than the holding member 24 and the molding member 22. The holding member 24 is made of, for example, steel and is formed by machining. The support member 23 is made of, for example, aluminum alloy and is formed by casting. The molding member 22 is made of, for example, maraging steel and is formed by a laminate molding (powder laminate molding etc.).

In the powder laminate molding, a powder is sintered to form the molding member 22 which is a powder sintered body. Specifically, a powder layer of predetermined thickness (the, e.g., metal powder layer) is formed and the powder layer is irradiated with a light beam (e.g., a laser beam) so as to be sintered the powder by heat of the light beam. In this way, a hardened layer (sintered layer) made of a sintered powder is formed. In addition, a plurality of hardened layers are sequentially laminated by repeating the formation of the powder layer and the formation of the hardened layer, so that the molding member 22 is formed into a predetermined shape. In this way, the molding member 22 which is a laminated body of the plurality of hardened layers is formed by laminating a powder hardened layer.

In the mold 10, each of the plurality of split molds 20 has the molding member 22, the support member 23 and a plurality of vent holes. At the time of molding the tire, the plurality of molding members 22 are put together into a ring shape while each of them is supported by the support members 23. The vent hole is a part of hole (vent part) of the mold 10 for exhausting air. Air is exhausted outside the mold 10 through the vent hole without being shut in between the tire and the mold 10 (here the molding member 22). The vent hole of the split mold 20 is formed in at least the molding member 22 and the support member 23 and opens to the molding surface 21 of the molding member 22. The mold 10 molds the tire by the plurality of molding members 22 while exhausting air through the vent holes.

FIGS. 2A to 2E are views showing a process of forming a vent hole 16 in the embodiment and schematically shows a section of a part (part for forming one vent hole 16) of the split mold 20.

As illustrated, at the time of forming the vent hole 16, a vent piece 30 is fixed in a fixing hole 40 of the mold 10. The vent piece 30 has the vent hole 16 and is fixed in the fixing hole 40 of the mold 10 by means of caulking. The fixing hole 40 is formed in the mold 10 and opens to the surface of the mold 10. By fixing the vent piece 30 in the mold 10, the mold 10 having the vent hole 16 is manufactured.

Specifically, at first, the molding member 22 is attached to the support member 23 so that the molding member 22 is supported by the support member 23 (cf. FIG. 2A). Successively, the fixing hole 40 is formed in the molding member 22 and the support member 23 of the mold 10 by hole machining (cf. FIG. 2B). The fixing hole 40 is a circular hole having a circular cross-section and, is formed in a predetermined hole diameter (inner diameter) D1. Here, the fixing hole 40 is a through-hole penetrating the molding member 22 and the support member 23 and opens to the surface (molding surface 21) of the molding member 22. A circular opening 41 of the fixing hole 40 is formed on the molding surface 21 of the molding member 22. In addition, the fixing hole 40 extends straight towards insides of the molding member 22 and the support member 23 from the molding surface 21 and opens to the back surface of the support member 23.

After forming the fixing hole 40, the support member 23 is attached to the holding member 24 and thus the molding member 22 and the support member 23 are held by the holding member 24 (cf. FIG. 2C). An opening on the holding member 24 side of the fixing hole 40 is covered by the holding member 24. Then, the vent piece 30 is inserted into the fixing hole 40 through the opening 41 of the fixing hole 40 (cf. FIG. 2D). In this way, a stepped part 31 of the vent piece 30 is brought into contact with the surface (molding surface 21) of the molding member 22 and a part of the vent piece 30 is arranged in the fixing hole 40.

Then, the vent piece 30 is pushed into the fixing hole 40 to be fixed in the fixing hole 40 (cf. FIG. 2E). At the time, the vent piece 30 is, for example, pressed into the fixing hole 40 or driven into the fixing hole 40. Due to pushing of the vent piece 30, at least one of the vent piece 30 and the fixing hole 40 is deformed, so that the vent hole 30 is caulked. At the time of caulking of the vent piece 30, for example, the fixing hole 40 is deformed to fit to a shape of the vent piece 30. In contrast, the vent peace 30 may be deformed to fit to a shape of the fixing hole 40, or the fixing hole 40 and the vent piece 30 may be deformed together.

The vent piece 30 is fixed to the molding member 22 and the support member 23 of the mold 10 by means of caulking. In the state, the whole of the vent piece 30 and the whole of the vent hole 16 are arranged in the fixing hole 40. One end of the vent hole 16 opens towards the internal space 15 of the mold 10, and the other end of the vent hole 16 is arranged in the fixing hole 40. Air between the tire and the mold 10 is exhausted through the vent hole 16 of the vent piece 30. Here, air is exhausted outside the mold 10, passing between the support member 23 and the holding member 24, after air is exhausted into the fixing hole 40 through the vent hole 16.

Figure 3:
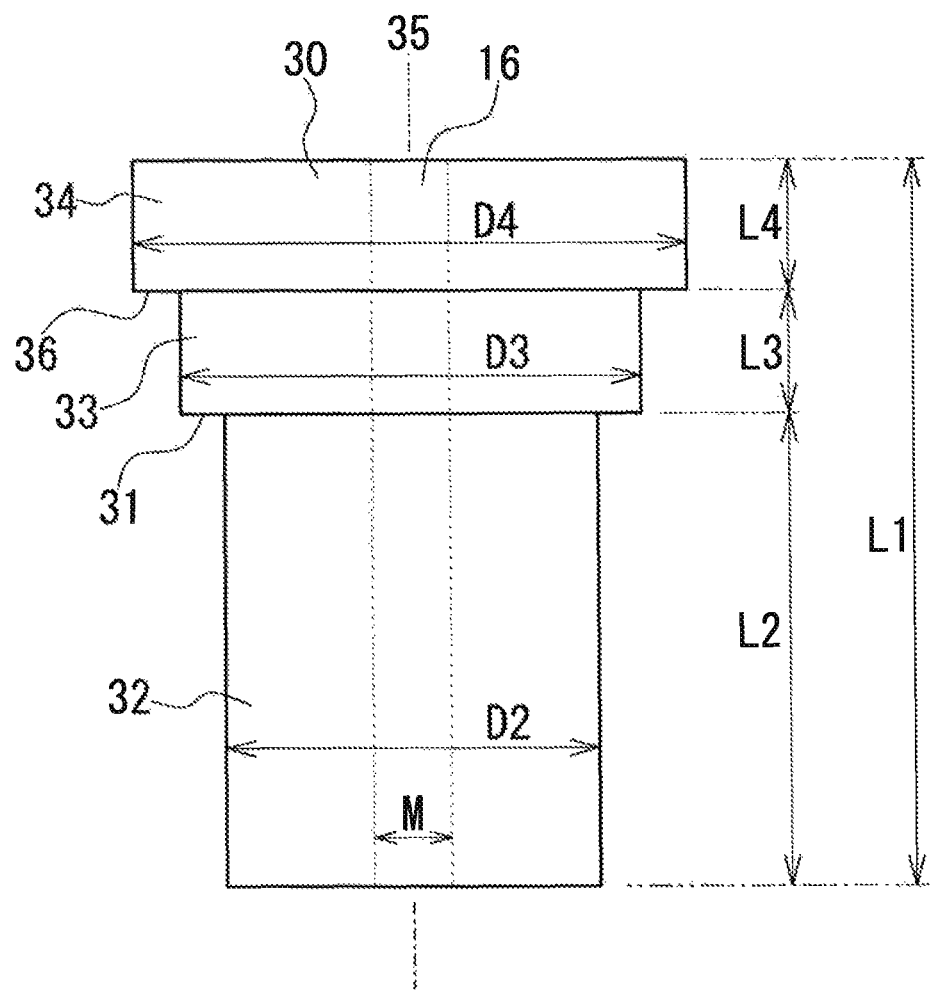
FIG. 3 is a side view illustrating a vent piece of the embodiment.

FIG. 3 is a side view illustrating the vent piece 30 of the embodiment and shows the vent piece 30 viewed from outside in a radial direction.

As illustrated, the vent piece 30 has one vent hole 16, two inspection parts (a first inspection part 32, a second inspection part 33) to be used for inspection of the fixing hole 40 and one caulking part 34 to be caulked in the fixing hole 40. The vent piece 30 is made of, for example, stainless steel (SUS304 (Japanese Industrial Standards) etc.) and is formed into a cylindrical shape by machining (lathe machining, hole machining). The vent hole 16 is formed in a predetermined hole diameter M and extends straight along a centerline 35 of the vent piece 30. The centerline 35 of the vent piece 30 is located at the center in the radial direction of the vent piece 30 and is orthogonal to the radial direction of the vent piece 30.

The vent hole 16 is a circular hole having a circular cross-section and is formed in the central part of the vent piece 30 including the centerline 35. In addition, the vent hole 16 is a through-hole penetrating the vent piece 30 in the direction of the centerline 35 (centerline direction) and opens to both end surfaces in the centerline direction of the vent piece 30. The first inspection part 32 includes one end of the vent piece 30, and the caulking part 34 includes the other end of the vent piece 30. The second inspection part 33 is an intermediate part of the vent piece 30 and is located between the first inspection part 32 and the caulking part 34.

The first inspection part 32, the second inspection part 33 and the caulking part 34 are formed into cylindrical shapes and are formed to have outer diameters D2, D3, D4, respectively, which are different from one another. Two ring-shaped stepped parts (a first stepped part 31, a second stepped part 36) are formed at the outer periphery of the vent piece 30. The first stepped part 31 is formed at the end of the second inspection part 33 connected to the first inspection part 32 due to a difference in outer diameters between the first inspection part 32 and the second inspection part 33. The second stepped part 36 is formed at the end of the caulking part 34 connected to the second inspection part 33 due to a difference in outer diameters between the second inspection part 33 and the caulking part 34.

The first inspection part 32 of the vent piece 30 is an insertion part to be inserted into the fixing hole 40 and is thinner than the second inspection part 33, the caulking part 34 and the fixing hole 40. In other words, the outer diameter D2 of the first inspection part 32 is smaller than the outer diameter D3 of the second inspection part 33, the outer diameter D4 of the caulking part 34 and the hole diameter D1 of the fixing hole 40. In addition, the outer diameter D2 of the first inspection part 32 has a value corresponding to the lower limit value of the hole diameter D1 of the fixing hole 40 and is set to be the value enabling insertion of the first inspection part 32 into the fixing hole 40. The lower limit value of the hole diameter D1 is the predetermined minimum value of the hole diameter D1 allowable as the hole diameter D1 of the fixing hole 40.

The second inspection part 33 of the vent piece 30 is a non-insertion part which is incapable to insert into the fixing hole 40 and is thicker than the first inspection part 32 and the fixing hole 40 and, is thinner than the caulking part 34. In other words, the outer diameter D3 of the second inspection part 33 is larger than the outer diameter D2 of the first inspection part 32 and the hole diameter D1 of the fixing hole 40 and is smaller than the outer diameter D4 of the caulking part 34. In addition, the outer diameter D3 of the second inspection part 33 has a value corresponding to the upper limit value of the hole diameter D1 of the fixing hole 40 and is set to be the value disabling insertion of the second inspection part 33 into the fixing hole 40. The upper limit value of the hole diameter D1 is the predetermined maximum value of the hole diameter D1 allowable as the hole diameter D1 of the fixing hole 40.

The caulking part 34 of the vent piece 30 is a fixed part to be fixed to the fixing hole 40 of the mold 10 by means of caulking and is thicker than the first inspection part 32, the second inspection part 33 and the fixing hole 40. In other words, the outer diameter D4 of the caulking part 34 is larger than the outer diameter D2 of the first inspection part 32, the outer diameter D3 of the second inspection part 33 and the hole diameter D1 of the fixing hole 40. In addition, the outer diameter D4 of the caulking part 34 has a value larger than an upper limit value of the hole diameter D1 of the fixing hole 40 and is set to be the value enabling fixing of the caulking part 34 to the fixing hole 40 after caulking. When the first inspection part 32 is inserted into the fixing hole 40 and the second inspection part 33 is not inserted into the fixing hole 40, the caulking part 34 is fixed in the fixing hole 40 by means of caulking, so that the vent piece 30 is fixed to the mold 10.

With respect to dimensions of the vent piece 30, lengths L1-L4 are lengths (dimensions) of the vent piece 30 and the parts 32, 33, 34 of the vent piece 30 in the centerline direction of the vent piece 30. The length L1 of the vent piece 30 is a length not less than 10 times and not more than 30 times of the hole diameter M of the vent hole 16 ((10×M)≤L1≤(30×M)). The length L4 of the caulking part 34 is a length of not less than 15% and not more than 25% of the length L1 of the vent piece 30 ((0.15×L1)≤L4≤(0.25×L1)). The length L3 of the second inspection part 33 is a length of not less than 5% and not more than 10% of the length L1 of the vent piece 30 ((0.05×L1)≤L3≤(0.1×L1)). The length L2 of the first inspection part 32 is a remaining length where the length L4 of the caulking part 34 and the length L3 of the second inspection part 33 are subtracted from L1 of the vent piece 30 and is the length of not less than 65% and not more than 80% of the length L1 of the vent piece 30 ((0.65×L1)≤L2≤(0.8×L1)).

With respect to surface roughness of the vent piece 30, the surface roughness Ra is an arithmetic average roughness prescribed in Japanese Industrial Standards (JIS B0601: 2001). The surface roughness Ra of the caulking part 34 is the surface roughness of a part being brought into contact with the inner surface of the fixing hole 40 (the outer surface of the caulking part 34) and is not less than 1 μm and not more than 3 μm. The surface roughness Ra of the second inspection part 33 is the surface roughness of a part being brought into contact with the inner surface of the fixing hole 40 (the outer surface of the second inspection part 33) and is not less than 1 μm and not more than 10 μm. The surface roughness Ra of the first inspection part 32 is the surface roughness of a part being arranged in the fixing hole 40 (the outer surface of the first inspection part 32) and is not less than 1 μm and not more than 20 μm.

Figure 4A:
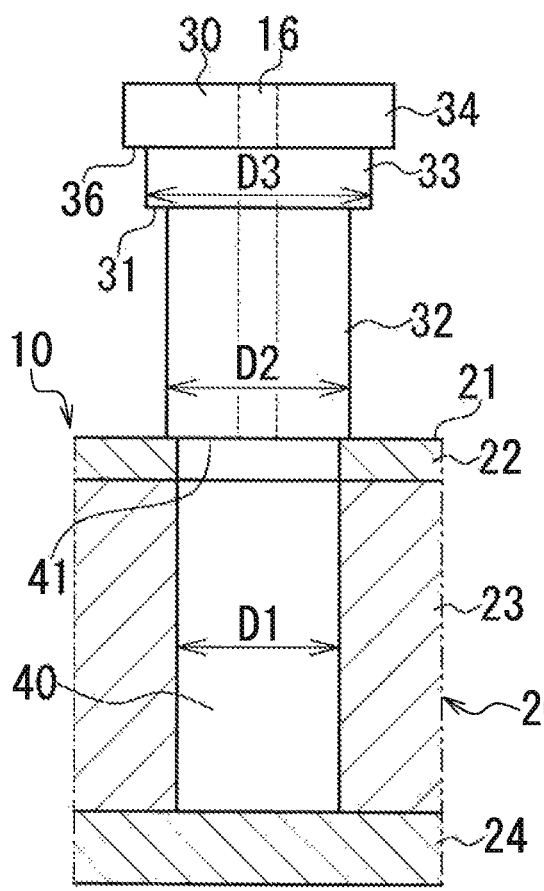
FIGS. 4A to 4C are views illustrating a fixing hole to be inspected by a first inspection part and a second inspection part of the vent piece.
Figure 4B:
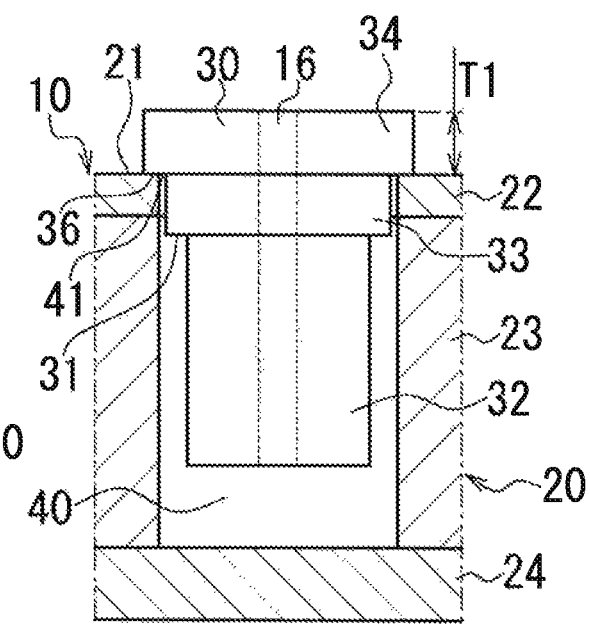
Figure 4C:
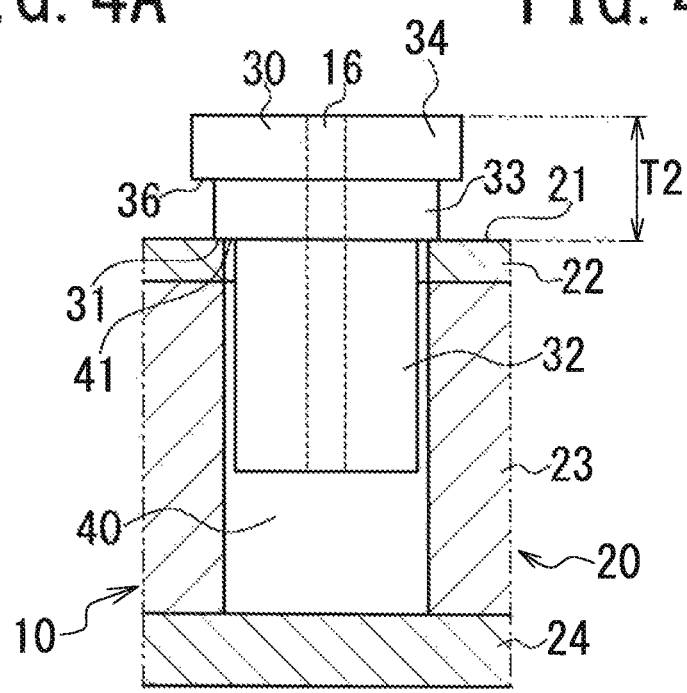

FIGS. 4A to 4C are views illustrating the fixing hole 40 to be inspected by the first inspection part 32 and the second inspection part 33 of the vent piece 30. FIG. 4 shows the side view of the vent piece 30 and the sectional view of the split mold 20 like FIG. 2.

As illustrated, at the time of fixing the vent piece 30 in the fixing hole 40, the hole diameter D1 of the fixing hole 40 is inspected by using the first inspection part 32 and the second inspection part 33 of the vent piece 30. At first, the first inspection part 32 of the vent piece 30 is arranged in the opening 41 of the fixing hole 40 to discriminate whether the first inspection part 32 is able to be inserted into the fixing hole 40. In this way, it is inspected whether the hole diameter D1 of the fixing hole 40 is larger than the outer diameter D2 of the first inspection part 32. At the time, it is discriminated whether the first inspection part 32 is able to be inserted into the fixing hole 40 without pushing the first inspection part 32, to inspect whether the hole diameter D1 of the fixing hole 40 is not less than the lower limit value.

When the first inspection part 32 cannot be inserted into the fixing hole 40 (cf. FIG. 4A), it is discriminated that the hole diameter D1 of the fixing hole 40 is not more than the outer diameter D2 of the first inspection part 32. Accordingly, it is discriminated that the hole diameter D1 of the fixing hole 40 is smaller than the lower limit and, it is determined that the hole diameter D1 of the fixing hole 40 does not satisfy the condition of the lower limit value and is unacceptable. When the first inspection part 32 is inserted into the fixing hole 40 (cf. FIG. 4B, FIG. 4C), it is discriminated that the hole diameter D1 of the fixing hole 40 is larger than the outer diameter D2 of the first inspection part 32. Accordingly, it is discriminated that the hole diameter D1 of the fixing hole 40 is not less than the lower limit value, and it is determined that the hole diameter D1 of the fixing hole 40 satisfies the condition of the lower limit value. In this way, it is inspected whether the hole diameter D1 of the fixing hole 40 satisfies the condition of the lower limit value by the first inspection part 32 of the vent piece 30.

When the hole diameter D1 of the fixing hole 40 is larger than the outer diameter D2 of the first inspection part 32 and the first inspection part 32 is inserted in the fixing hole 40, it is discriminated whether the second inspection part 33 of the vent piece 30 can be inserted into the fixing hole 40 with the whole of the first inspection part 32 being inserted into the fixing hole 40. In this way, it is inspected whether the hole diameter D1 of the fixing hole 40 is smaller than the outer diameter D3 of the second inspection part 33. At the time, it is discriminated whether the second inspection part 33 can be inserted into the fixing hole 40 without pushing the second inspection part 33, and it is inspected whether the hole diameter D1 of the fixing hole 40 is not more than the upper limit value.

When the second inspection part 33 is inserted into the fixing hole 40 (cf. FIG. 4B), it is discriminated that the hole diameter D1 of the fixing hole 40 is larger than the outer diameter D3 of the second inspection part 33. Accordingly, it is discriminated that the hole diameter D1 of the fixing hole 40 is larger than the upper limit value, and it is determined that the hole diameter D1 of the fixing hole 40 does not satisfy the condition of the upper limit value and is unacceptable. At the time, the caulking part 34 is brought into contact with the surface of the mold 10 (molding member 22) and comes to a stop at a position of the opening 41 of the fixing hole 40. The second stepped part 36 of the vent piece 30 is brought into contact with the surface of the mold 10, and the first inspection part 32 and the second inspection part 33 are arranged in the fixing hole 40. In addition, the caulking part 34 is located outside the fixing hole 40 and is projected from the opening 41. Or the caulking part 34 is inserted into the fixing hole 40 in addition to the second inspection part 33.

When the second inspection part 33 cannot be inserted into the fixing hole 40 (cf. FIG. 4C), it is discriminated that the hole diameter D1 of the fixing hole 40 is not more than the outer diameter D3 of the second inspection part 33. Accordingly, it is discriminated that the hole diameter D1 of the fixing hole 40 is not more than the upper limit value, and it is determined that the hole diameter D1 of the fixing hole 40 satisfies the condition of the upper limit value. At the time, the second inspection part 33 is brought into contact with the surface of the mold 10 and comes to the stop at a position of the opening 41 of the fixing hole 40. The first stepped part 31 of the vent piece 30 is brought into contact with the surface of the mold 10, and only the first inspection part 32 is arranged in the fixing hole 40. In addition, the second inspection part 33 and the caulking part 34 are arranged outside the fixing hole 40 and are protected from the opening 4l. In this way, it is inspected whether the hole diameter D1 of the fixing hole 40 satisfies the condition of the upper limit value by the second inspection part 33 of the vent piece 30.

It is inspected whether the hole diameter D1 of the fixing hole 40 satisfies the condition of an allowable range of the hole diameter D1 by the first inspection part 32 and the second inspection part 33 of the vent piece 30. In other words, it is discriminated whether the hole diameter D1 of the fixing hole 40 is the value in the predetermined allowable range by using first inspection part 32 and the second inspection part 33, so that the hole diameter D1 of the fixing hole 40 is inspected. When the first inspection part 32 is inserted into the fixing hole 40 and the second inspection part 33 is not be inserted into the fixing hole 40, it is discriminated that the hole diameter D1 of the fixing hole 40 is the value between the upper limit value and the lower limit value (the value that is not more than the upper limit value and not less than the lower limit value). In this way, it is discriminated that the hole diameter D1 of the fixing hole 40 is the value in the allowable range. In addition, it is determined that the hole diameter D1 of the fixing hole 40 satisfies the condition of the allowable range (conditions of the upper limit value and the lower limit value) and is acceptable.

Here, after insertion of the first inspection part 32 into the fixing hole 40, it is discriminated whether the second inspection part 33 can be inserted into the fixing hole 40 based on a projecting length of the vent piece 30 projecting from the opening 41 of the fixing hole 40. Specifically, the projecting length of the vent piece 30 is measured, and it is discriminated whether the second inspection part 33 is inserted into the fixing hole 40 based on whether a measured value of the projecting length satisfies the predetermined condition of the projecting length. The condition of the projecting length is the condition that it is discriminated that the second inspection part 33 is not inserted into the fixing hole 40, and is preset based on the length L4 of the caulking part 34 and the length L3 of the second inspection part 33. For example, the condition of the projecting length is a reference value of a total projecting length of length L4 of the caulking part 34 and the length L3 of the second inspection part 33.

When the measured value T1 of the projecting length does not satisfy the condition of the projecting length (cf. FIG. 4B), it is discriminated that the second inspection part 33 is located in the fixing hole 40, that is, the second inspection part 33 is inserted into the fixing hole 40. When the measured value T2 of the projecting length satisfies the condition of the projecting length (cf. FIG. 4C), it is discriminated that the second inspection part 33 is located outside the fixing hole 40, that is, the second inspection part 33 is not inserted into the fixing hole 40.

When the hole diameter D1 of the fixing hole 40 is smaller than the outer diameter D3 of the second inspection part 33 and thus the second inspection part 33 cannot be inserted into the fixing hole 40, the second inspection part 33 is arranged to overlap with the opening 41 of the fixing hole 40 and thus the opening 41 of the fixing hole 40 is covered by the second inspection part 33 (cf. FIG. 2D). Successively, the vent piece 30 is pushed into the fixing hole 40 and the caulking part 34 of the vent piece 30 is fixed in the fixing hole 40 of the mold 10 by means of caulking (cf. FIG. 2E). At that time, the whole of the vent piece 30 is arranged in the fixing hole 40 by pushing the second inspection part 33 and the caulking part 34 into the fixing hole 40. In accordance with this, the caulking part 34 is arranged in the fixing hole 40 of the molding member 22 and the support member 23 and is fixed to the molding member 22 and the support member 23 by means of caulking. The second inspection part 33 is arranged in the fixing hole 40 of the support member 23 and is fixed to the support member 23 by means of caulking.

The vent piece 30 is fixed to the molding member 22 and the support member 23 of the mold 10 by caulking at least the caulking part 34 (here, the caulking part 34 and the second inspection part 33). The molding member 22 and the support member 23 are connected by the vent piece 30 in the fixing hole 40. The caulking part 34 and the second inspection part 33 are closely contacted with the inner surface of the fixing hole 40, so that the opening 41 of the fixing hole 40 except the vent hole 16 is closed with the caulking part 34. In addition, the whole of the first inspection part 32 is arranged in the fixing hole 40, and a gap is formed between the first inspection part 32 and the inner surface of the fixing hole 40. The first inspection part 32 is arranged in the fixing hole 40 of the support member 23.

As described above, according to the method for manufacturing the mold 10 of the present embodiment, the hole diameter D1 of the fixing hole 40 can be easily inspected by the vent piece 30 at the time of fixing the vent piece 30 into the fixing hole 40. In addition, the vent piece 30 can be securely fixed to the fixing hole 40 of the mold 10 by means of caulking. It can be inspected whether the hole diameter D1 of the fixing hole 40 is appropriate for the outer diameters D2, D3, D4 of the vent piece 30, too. When a failure of outer diameter occurred in the vent piece 30, the outer diameters D2, D3, D4 of the vent piece 30 can be inspected.

When the length L4 of the caulking part 34 is a length less than 15% of the length L1 of the vent piece 30, a power (fixing force) to fix the caulking part 34 to the mold 10 is likely to decrease. When the length L4 of the caulking part 34 is a length more than 25% of the length L1 of the vent piece 30, it becomes hard to push the caulking part 34 into the fixing hole 40. Therefore, the length L4 of the caulking part 34 is preferably a length not less than 15% and not more than 25% of the length L1 of the vent piece 30. In this way, the caulking part 34 is appropriately pushed into the fixing hole 40, so that the fixing force generated at the caulking part 34 is surely secured.

When the length L3 of the second inspection part 33 is a length less than 5% of the length L1 of the vent piece 30, it becomes hard to discriminate whether the second inspection part 33 is inserted into the fixing hole 40. When the length L3 of the second inspection part 33 is a length more than 10% of the length L1 of the vent piece 30, it becomes hard to push the second inspection part 33 into the fixing hole 40. Therefore, the length L3 of the second inspection part 33 is preferably a length not less than 5% and not more than 10% of the length L1 of the vent piece 30. In this way, it is easily discriminated whether the second inspection part 33 is inserted into the fixing hole 40, so that the second inspection part 33 is appropriately pushed into the fixing hole 40.

At the time of molding the tire, the rubber may enter into the vent hole 16, and thus a beard-like rubber (spew) may be generated in the tire. In this case, heat of the spew is released by the first inspection part 32 in the fixing hole 40, so that the spew becomes hard to be broken. When the length L2 of the first inspection part 32 is a length not less than 65% and not more than 80% of the length L1 of the vent piece 30, heat of the spew is surely dissipated. In contrast, when the length L2 of the first inspection part 32 is a length less than 65% of the length L1 of the vent piece 30, a heat dissipation performance of the first inspection part 32 is likely to be effected. By increasing a thermal conductivity of the support member 23 higher than a thermal conductivity of the molding member 22, the heat of the spew can be more surely dissipated.

When the surface roughness Ra of the caulking part 34 is less than 1 µm, a machining of the caulking part 34 becomes difficult. When the surface roughness Ra of the caulking part 34 is more than 3 µm, a close contacting performance of the caulking part 34 to the mold 10 (here, the molding member 22 and the support member 23) is likely to be affected. Therefore, the surface roughness Ra of the caulking part 34 is preferable to be not less than 1 µm and not more than 3 µm. In this way, the caulking part 34 is easily machined, and the caulking part 34 is surely and closely contacted with the mold 10.

When the surface roughness Ra of the second inspection part 33 is less than 1 µm, a machining of the second inspection part 33 becomes difficult. When the surface roughness Ra of the second inspection part 33 is more than 10 µm, a close contacting performance of the second inspection part 33 to the mold 10 (here, the support member 23) is likely to be affected. Therefore, the surface roughness Ra of the second inspection part 33 is preferable to be not less than 1 µm and not more than 10 µm. In this way, the second inspection part 33 is easily machined, and the second inspection part 33 is surely and closely contacted with the mold 10.

When the surface roughness Ra of the first inspection part 32 is less than 1 µm, a machining of the first inspection part 32 becomes difficult. When the surface roughness Ra of the first inspection part 32 is more than 20 µm, the heat dissipation performance of the first inspection part 32 is likely to be affected. Therefore, the surface roughness Ra of the first inspection part 32 is preferable to be not less than 1 µm and not more than 20 µm. In this way, the first inspection part 32 is easily machined, and heat of the spew is surely dissipated by the first inspection part 32.

With respect to the outer diameter D4 of the caulking part 34 and the hole diameter D1 of the fixing hole 40, the ratio (the first ratio) of difference between D4 and D1 to D1 is $((D4-D1)/D1) \times 100$. When the first ratio is less than 0.5%, the fixing force generated at the caulking part 34 is likely to become small. When the first ratio is more than 5%, the caulking part 34 is likely to be damaged at the time of pushing into the fixing hole 40. Therefore, the first ratio is preferable to be not less than 0.5% and not more than 5%. In this way, the fixing force generated at the caulking part 34 is secured, and the caulking part 34 is restrained from damaging. In addition, the first ratio is more preferable to be not less than 2% and not more than 4%.

With respect to the outer diameter D3 of the second inspection part 33 and the hole diameter D1 of the fixing hole 40, the ratio (the second ratio) of difference between D3 and D1 to D1 is $(((D3-D1)/D1)\times 100)$. When the second ratio is less than 0.5%, the fixing force generated at the second inspection part 33 is likely to become small. When the second ratio is more than 3%, a deformation of the second inspection part 33 is likely to become large at the time of pushing into the fixing hole 40. Therefore, the second ratio is preferable to be not less than 0.5% and not more than 3%. In this way, the fixing force generated at the second inspection part 33 is secured, and the second inspection part 33 is restrained from being deformed. In addition, the second ratio is more preferable to be not less than 1% and not more than 2%. When the first ratio is larger than the second ratio, all of the inspection performance, the caulking performance and a durability performance are secured in the vent piece 30.

When the vent hole 16 is directly formed in the molding member 22 and the support member 23, during molding of the tire, a rubber of the spew enters between the molding member 22 and the support member 23, and the spew becomes easy to be broken. When the spew is broken, it is necessary to remove the rubber in the vent hole 16 to eliminate a clogging of the vent hole 16. In particular, when the molding member 22 is formed by the laminate molding, the surface of the molding member 22 becomes rough, and thus the rubber easily enters into a gap between the molding member 22 and the support member 23. In contrast, here, the caulking part 34 of the vent piece 30 is fixed in the fixing hole 40 of the molding member 22 by means of caulking. As a result, rubber of the spew can be prevented from entering between the molding member 22 and the support member 23.

Figure 5:
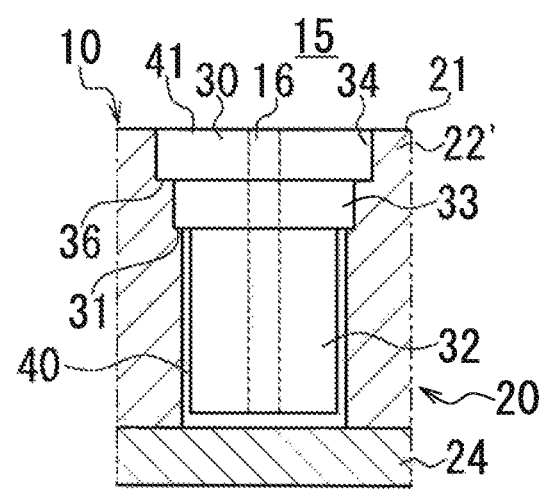
FIG. 5 is a view showing the fixed state of the vent piece of the other embodiment.

Further, the molding member 22 is formed by the powder laminate molding using various powder (e.g., metal powder, ceramics powder) which can be sintered. In contrast, the molding member 22 may be formed by a formation processing (e.g., machining, casting) other than the powder laminate molding. In addition, like the other embodiment, the molding member 22 and the support member 23 are integrally formed by casting to make a molding member 22' which is shown in FIG. 5 and thus the split mold 20 of the mold 10 may be composed of the molding member 22' and the holding member 24. Or, the split mold 20 of the mold 10 may be provided with a member other than the molding member 22, the support member 23 and the holding member 24. In addition, only the molding member 22 and the support member 23 may be provided in the split mold 20 without providing the holding member 24 therein. In other words, the mold 10 has at least the molding member 22 and the support member 23 in the split mold 20.

The vent piece 30 may be fixed in the fixing hole 40 of the mold other than the split mold 20 (e.g., upper side mold 11, lower side mold 12). In this way, a mold fixing the vent piece 30 may be a mold having only one member or a mold having a plurality of members. In an inside of the fixing hole 40, an hole diameter of a part not housing the vent piece 30 may be formed different from the hole diameter D1 of a part housing the vent piece 30.

As mentioned above, the method for manufacturing a mold has been explained, taking it as an example that the rubber article is the tire, but the rubber article may be other rubber article without being limited to the tire. The rubber article is an article made of rubber which is molded by a mold, for example, an article consisting of only rubber or an article consisting of rubber and other materials.

REFERENCE SIGNS LIST

1 . . . tire molding device
2 . . . container
10 . . . mold
11 . . . upper side mold
12 . . . lower side mold
13 . . . molding surface
14 . . . molding surface
15 . . . internal space
16 . . . vent hole
20 . . . split mold
21 . . . molding surface
22, 22' . . . molding member
23 . . . support member
24 . . . holding member
30 . . . vent piece
31 . . . first stepped part
32 . . . first inspection part
33 . . . second inspection part
34 . . . caulking part
35 . . . centerline
36 . . . second stepped part
40 . . . fixing hole
41 . . . opening

What is claimed is:

1. A method for manufacturing a mold for rubber article so as to manufacture the mold for rubber article having vent holes by fixing a vent piece having the vent hole in a fixing hole of the mold for rubber article, wherein
   the vent piece has a first inspection part that is to be inserted into the fixing hole, a caulking part that is thicker than the first inspection part and is to be fixed in the fixing hole by means of caulking, and a second inspection part that is positioned between the first inspection part and the caulking part and is thicker than the first inspection part and thinner than the caulking part, and
   when the first inspection part of the vent piece is inserted into the fixing hole but the second inspection part of the vent piece is not inserted into the fixing hole, the caulking part of the vent piece is fixed in the fixing hole by means of caulking.

2. The method for manufacturing mold for rubber article according to claim 1, comprising steps of;
   discriminating whether the first inspection part of the vent piece is inserted into the fixing hole so as to inspect whether the hole diameter of the fixing hole is larger than the outer diameter of the first inspection part,
   discriminating whether the second inspection part of the vent piece is inserted into the fixing hole when the first inspection part of the vent piece is inserted into the fixing hole, so as to inspect whether the hole diameter of the fixing hole is smaller than the outer diameter of the second inspection part, and
   pushing the vent piece into the fixing hole and fixing the caulking part of the vent piece in the fixing hole by means of caulking, when the second inspection part of the vent piece is not inserted into the fixing hole.

3. The method for manufacturing mold for rubber article according to claim 1, wherein
   the mold for rubber article has a molding member to mold the rubber article and a support member to support the molding member, the fixing hole is formed in the molding member and the support member and opens to a molding surface of the molding member, and the caulking part of the vent piece is fixed in the fixing hole of the molding member by means of caulking.

4. The method for manufacturing mold for rubber article according to claim 1, wherein
a length of the caulking part of the vent piece is a length not less than 15% and not more than 25% of a length of the vent piece.

5. The method for manufacturing mold for rubber article according to claim 1, wherein
a length of the second inspection part of the vent piece is a length not less than 5% and not more than 10% of the length of the vent piece.

6. The method for manufacturing mold for rubber article according to claim 1, wherein
a surface roughness Ra of the caulking part of the vent piece is not less than 1 μm and not more than 3 μm.

7. The method for manufacturing mold for rubber article according to claim 1, wherein
a surface roughness Ra of the second inspection part of the vent piece is not less than 1 μm and not more than 10 μm.

8. The method for manufacturing mold for rubber article according to claim 2, wherein
the mold for rubber article has a molding member to mold the rubber article and a support member to support the molding member,
the fixing hole is formed in the molding member and the support member and opens to a molding surface of the molding member, and
the caulking part of the vent piece is fixed in the fixing hole of the molding member by means of caulking.

9. The method for manufacturing mold for rubber article according to claim 2, wherein
a length of the caulking part of the vent piece is a length not less than 15% and not more than 25% of a length of the vent piece.

10. The method for manufacturing mold for rubber article according to claim 2, wherein
a length of the second inspection part of the vent piece is a length not less than 5% and not more than 10% of the length of the vent piece.

11. The method for manufacturing mold for rubber article according to claim 2, wherein
a surface roughness Ra of the caulking part of the vent piece is not less than 1 μm and not more than 3 μm.

12. The method for manufacturing mold for rubber article according to claim 2, wherein
a surface roughness Ra of the second inspection part of the vent piece is not less than 1 μm and not more than 10 μm.

13. The method for manufacturing mold for rubber article according to claim 3, wherein
a length of the caulking part of the vent piece is a length not less than 15% and not more than 25% of a length of the vent piece.

14. The method for manufacturing mold for rubber article according to claim 3, wherein
a length of the second inspection part of the vent piece is a length not less than 5% and not more than 10% of the length of the vent piece.

15. The method for manufacturing mold for rubber article according to claim 3, wherein
a surface roughness Ra of the caulking part of the vent piece is not less than 1 μm and not more than 3 μm.

16. The method for manufacturing mold for rubber article according to claim 3, wherein
a surface roughness Ra of the second inspection part of the vent piece is not less than 1 μm and not more than 10 μm.

17. The method for manufacturing mold for rubber article according to claim 4, wherein
a length of the second inspection part of the vent piece is a length not less than 5% and not more than 10% of the length of the vent piece.

18. The method for manufacturing mold for rubber article according to claim 4, wherein
a surface roughness Ra of the caulking part of the vent piece is not less than 1 μm and not more than 3 μm.

19. The method for manufacturing mold for rubber article according to claim 4, wherein
a surface roughness Ra of the second inspection part of the vent piece is not less than 1 μm and not more than 10 μm.

20. The method for manufacturing mold for rubber article according to claim 5, wherein
a surface roughness Ra of the caulking part of the vent piece is not less than 1 μm and not more than 3 μm.

* * * * *